May 5, 1953      J. D. RIESER      2,637,215
ADJUSTABLE SPEED TRANSMISSION
Filed July 10, 1947      4 Sheets-Sheet 1
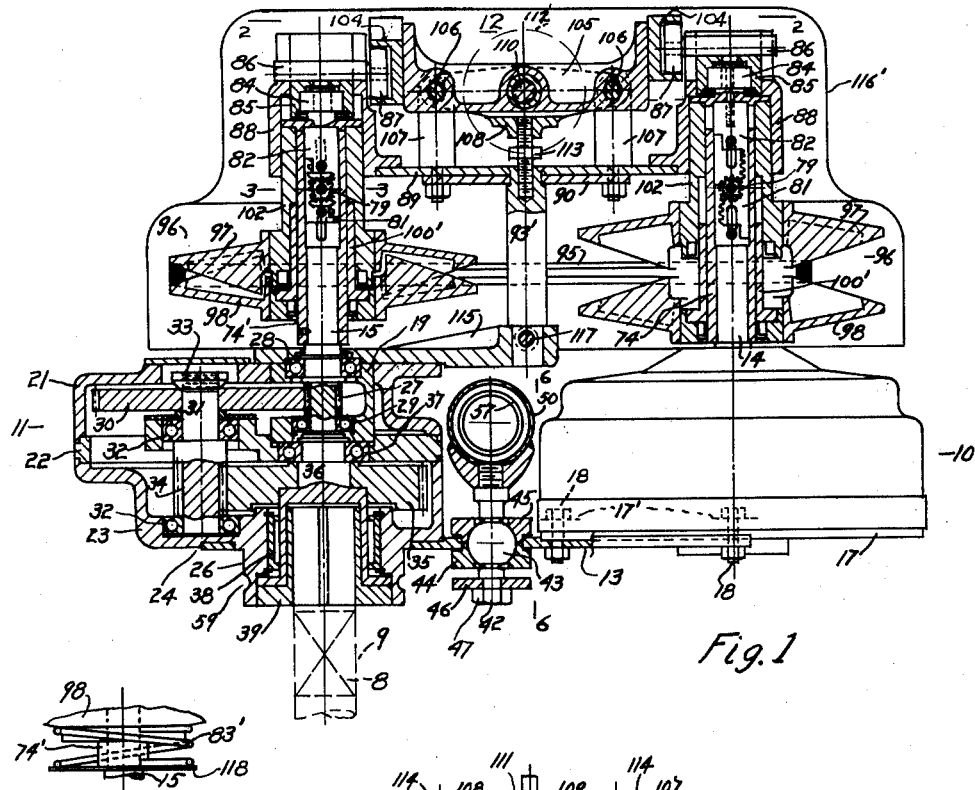
Fig. 1
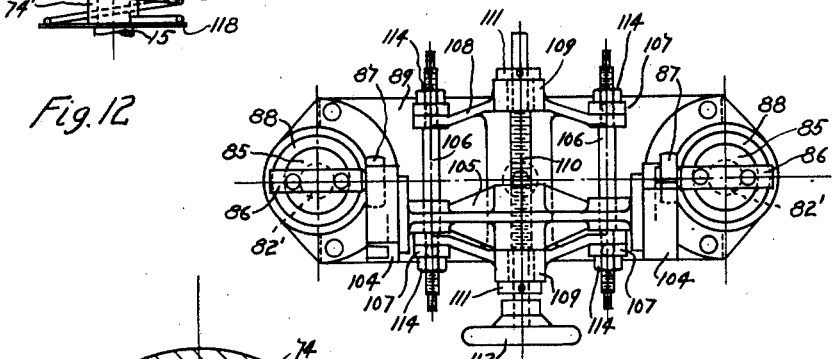
Fig. 12
Fig. 2
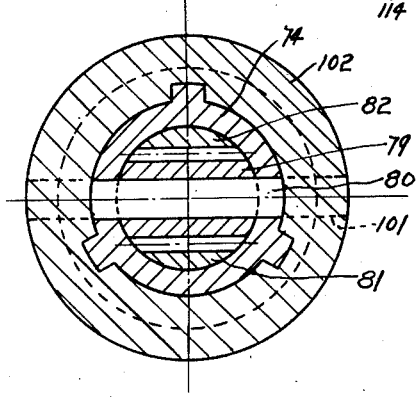
Fig. 3
INVENTOR.
John D. Rieser
BY Robert G. Pierce
ATTORNEY May 5, 1953 J. D. RIESER 2,637,215
ADJUSTABLE SPEED TRANSMISSION
Filed July 10, 1947 4 Sheets-Sheet 2
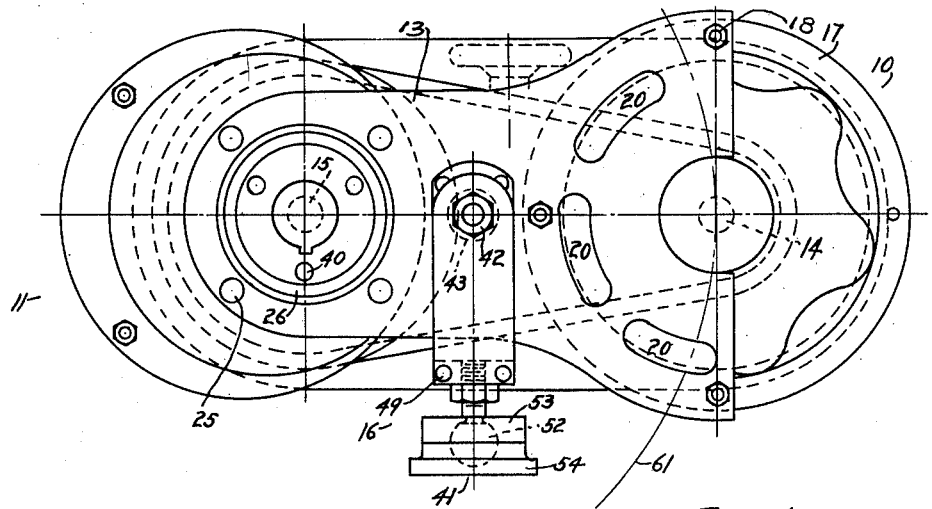
Fig. 4
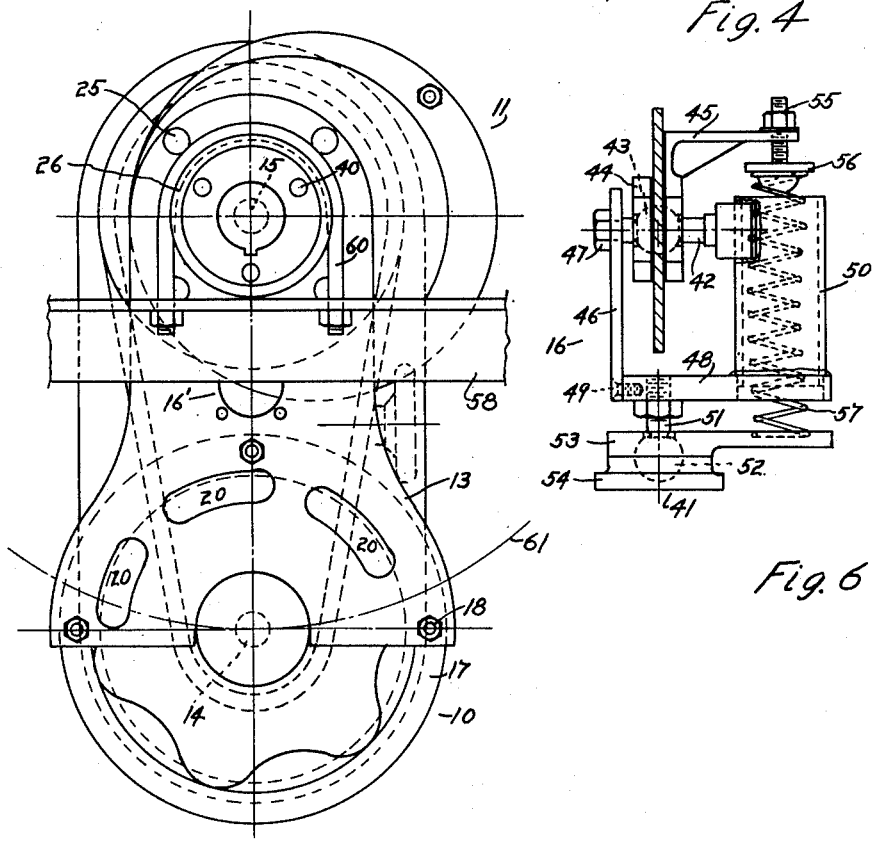
Fig. 5
Fig. 6
INVENTOR.
John D. Rieser
BY Robert G. Pierce
ATTORNEY May 5, 1953 J. D. RIESER 2,637,215
ADJUSTABLE SPEED TRANSMISSION
Filed July 10, 1947 4 Sheets-Sheet 3
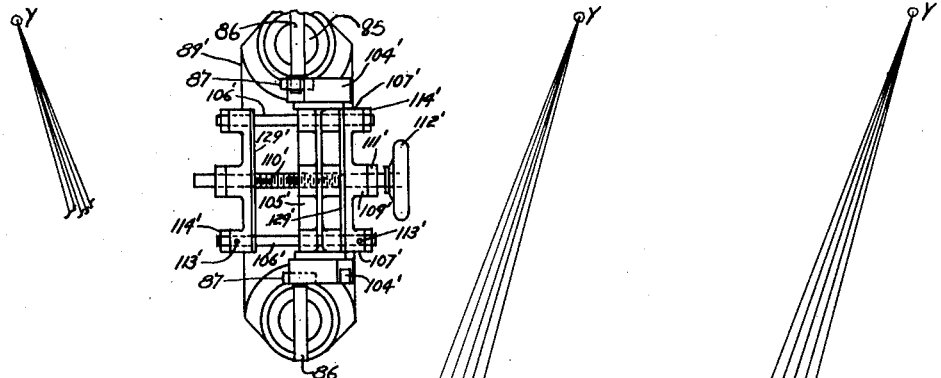
Fig. 13
Fig. 7
Fig. 8
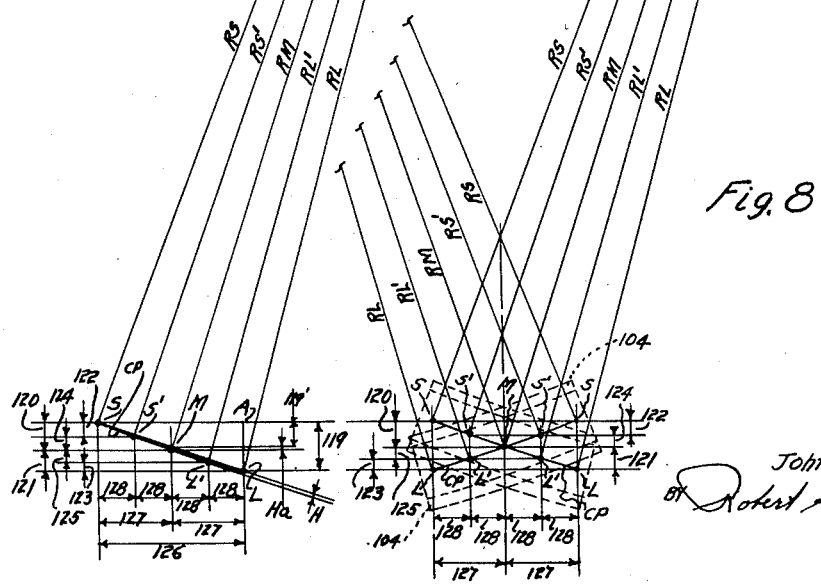
INVENTOR.
John D. Rieser.
BY Robert H. Pierce
ATTORNEY May 5, 1953  J. D. RIESER  2,637,215
ADJUSTABLE SPEED TRANSMISSION
Filed July 10, 1947  4 Sheets-Sheet 4

INVENTOR.
John D. Rieser
BY Robert G. Quine
ATTORNEY

Patented May 5, 1953

2,637,215

UNITED STATES PATENT OFFICE 2,637,215

ADJUSTABLE SPEED TRANSMISSION

John D. Rieser, San Francisco, Calif.

Application July 10, 1947, Serial No. 760,045

19 Claims. (Cl. 74—230.17)

This invention relates to adjustable speed transmissions and, more particularly, to a V belt adjustable speed transmission employing a pair of adjustable effective diameter pulleys, mounted for rotation in spaced, parallel relationship, and having an endless V belt trained about and therebetween their effective diameters to transmit power from one to the other, and to change the drive ratio between the pair of adjustable effective diameter pulleys whereby the controllable adjustability of the adjustable effective diameter of the pulleys is in accord, one with respect to the other, throughout the entire cycle of adjustment.

In my prior Patent No. 2,183,267, dated December 12, 1939, I have disclosed a construction in which an electric motor is mounted in a housing, and supportably secured within the housing is a frame, of which the dimensions are within the inner perimeter of the V belt employed, allowing for the insertion or removal of V belts without the dismantling of the shafts. The adjusting mechanism controlling the effective diameter pulleys is joined near each end of each of the two spaced parallel mounted shafts adjacent four bearing housings. The bearing housings are supported in their adjusted position by the frame and another portion of this adjusting mechanism is pivoted about this frame. The arrangement effected the desired condition of constant belt path length about and therebetween the effective diameters of the pulleys through the entire range of the adjustable effective diameter pulleys in one direction, while in other direction, reliance is made on the adjusting mechanism taken together with the V belt therebetween the pulley halves at each shaft to force a pin bearing upon the guiding face of a cam to effect actuation in accordance in the other direction. Takeup means is provided and is shown as being located at diagonally opposite positions with respect to one another about each of the two shafts, which requires that both be adjusted separately and equally to maintain proper relationship of the system. And in my prior application Serial No. 590,749, filed April 28, 1945, now Patent No. 2,573,493, I disclose a variable speed transmission, employing a pair of pulleys mounted for rotation in adjustable spaced parallel relationship, one of the pulleys being controllably movabe with respect to the other to effect change of said space and to simultaneously effect a change in the effective diameter of one of said pulleys through entire range for an endless V belt connecting said pair of pulleys.

An object of the present invention is to provide improved and simplified adjustable speed transmission units, employing a cooperating pair of adjustable effective diameter V pulley structures, supportably mounted for rotation in a spaced, parallel relationship, and throughout the cycle of their adjustable drive ratio, to maintain condition of constant belt path length about and therebetween the effective diameter of the V pulley structures, for an endless V belt trained about and therebetween the adjustable effective diameters of the V pulley structures, whereby power is transmitted from one to the other.

Another object of the present invention is to provide facility in the application of the adjustable speed transmission units, formed of a driving electric motor and adjustable speed change mechanism arrangement, correlatively supported and having a support means, forming a unit mountable directly about portion of a to-be-driven drive shaft of the to-be-driven machinery.

Another object of the present invention is to provide, in the preceding arrangement, an adjustable speed transmission unit support having a base structure for anchorage to a foundation, and disposed so as to virtually avert support of the unit by the driven drive shaft connection to said unit.

Another object of the present invention is to provide in the preceding adjustable speed transmission unit and the support with base structure for fixed anchorage to a foundation, the support being constructed to effect its function with flexibility between said unit and said support means or said unit and said base structure.

Another object of the present invention is to provide in the foregoing adjustable speed transmission units, particularly as to the combination of the support and mountability of the unit directly about a to-be-driven drive shaft of the to-be-driven machinery, that the support means, practically compensate for overhung situation about the to-be-driven drive shaft of the unit, and/or the belt driving pull, independently of the to-be-driven drive shaft structure.

Another object of the present invention is to provide an adjustable speed transmission device in which support for the actuating mechanism effecting adjustment of the effective diameter of the adjustable effective diameter pulleys extends through the innner perimeter of the V belt that is trained about and therebetween the effective diameter of the adjustable effective diameter pulleys.

Another object of the present invention is to provide an adjustable speed transmission device in which support for the actuating mechanism effecting adjustment of the effective diameter of the adjustable effective diameter pulleys together with support for journals at end portion of each of the shafts mounting said adjustable pulleys extends through the inner perimeter of the V belt trained about and therebetween the effective diameter of the adjustable effective diameter pulleys.

Another object of the present invention is to provide an adjustable speed transmission device, forming a unit, to project sideways from the support structure in a manner to afford removal or placement of the driving V belts while the operative condition of rotative supportability of the shafts remains effective, and/or averting upset of the actuating mechanism of the device.

Another object of the present invention is to provide an adjustable speed transmission device having a cooperating pair of adjustable effective diameter pulley structures mounted for rotation in spaced parallel relationship with respect to one another, with an endless V belt trained about and therebetween their effective diameters, and each of said pair of adjustable effective diameter pulley structures being formed of a pair of sections axially movable with respect to one another by actuating mechanism, which effects said axial movement in accordance with the actuation of an operator operative means, and said actuating mechanism being mounted about one end of the adjustable speed transmission device.

Another object of the present invention is to provide in the preceding arrangement, takeup means conjointly with said actuating mechanism, to change the effective diameter of a cooperating pair of adjustable effective diameter V pulley structures simultaneously by equal amounts and to effect change of the belt path length about and therebetween the effective diameter of said adjustable pulley structures as desired, and to avert change of the drive ratio between said cooperating pair of adjustable effective pulleys and to avert upset of the actuating mechanism.

Another object of the present invention is to provide resilient means to induce an active force opposite to that of the wedge acting forces of the V belt about sections forming the adjustable effective diameter pulleys, but said active force of said resilient means being restrained from upsetting an adjusted effective diameter of either of said cooperating pair of adjustable pulleys effected by said actuating mechanism.

This invention possesses other advantages and has other objects which may be made more easily apparent from a consideration of several embodiments of the invention. For this purpose there are outlined several forms. These forms will now be described in detail to illustrate the general principles of the invention, but it is to be understood that this detailed description is not to be taken in a limiting sense as the same is susceptible of modification without departing from the spirit or scope of the invention which is broadly set forth in the appended claims.

In the accompanying drawings:

Figure 1 is a plan partly in section of Figure 4.

Figure 2 is an end elevation taken on the line 2—2 of Figure 1, and also in like manner of Figure 9.

Figure 3 is an enlarged section taken on the line 3—3 of Figure 1.

Figure 4 is an end elevation taken on the power takeoff end and operatively arranged for horizontal drive, and utilizing the selfaligning support with counterpoise.

Figure 5 is an end elevation of a drive, similar to that of the Figure 1, but operatively arranged for vertical drive and utilizing the universal mounting hub for support.

Figure 6 is an elevation section to show the selfaligning support with the counterpoise, taken on the line 6—6 of Figure 1.

Figure 7 is a plan diagram, typical detail of curved center of control, controlling axial movement of the control roller of the unit shown in Figures 9 and 10.

Figure 8 is a plan diagram showing true relationship of center paths of the roller control members controlling movement of the pulley halves of the unit shown in Figures 9 and 10.

Figure 12 is an enlarged fragment showing possible application of the reactance device for the unit shown in Figure 1.

Figure 13 is an end elevation, similar to that of the Figure 2, of modified arrangement of the takeup to accommodate drive, having only one pulley section of each cooperating pair of adjustable pulleys adjustable axially.

Figures 9, 10, 11:
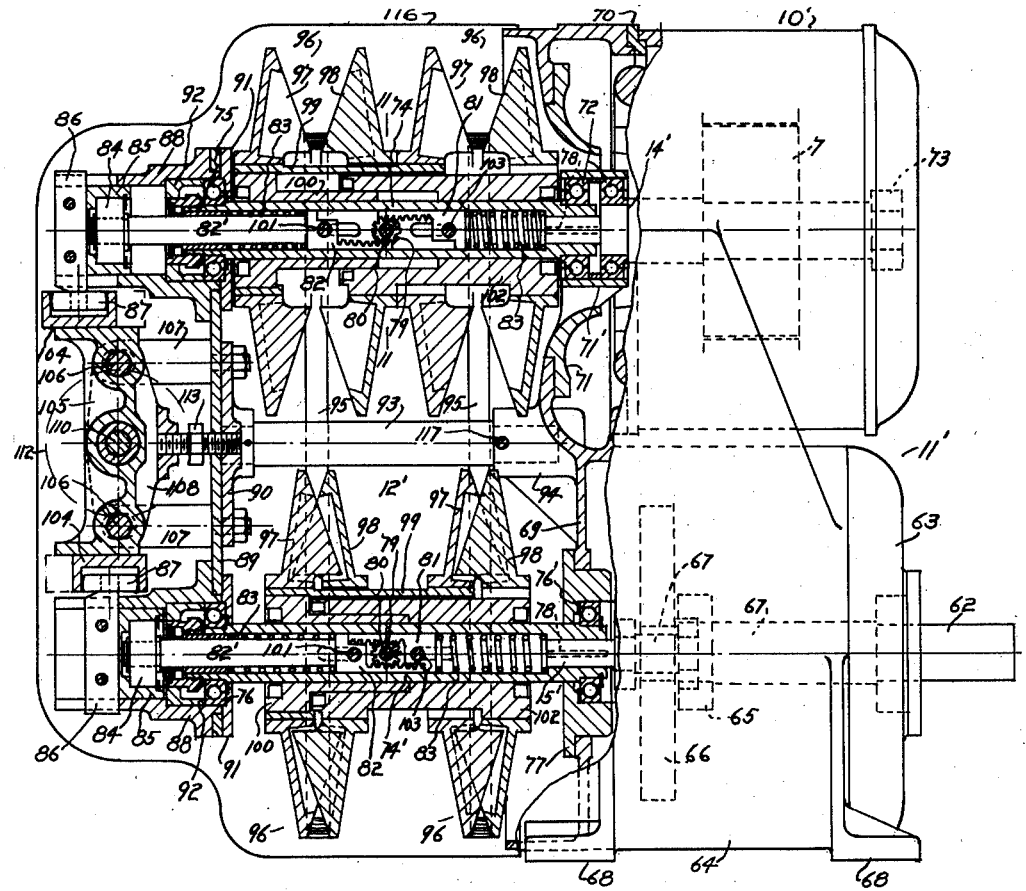
Figure 9 is a plan of a side elevation partly in section of a modified application of the adjustable speed device applied in Figure 1.
Figure 10 is a reduced end elevation taken on the power takeoff end of the drive shown in Figure 9.
Figure 11 is an enlarged section taken on the line 11—11 of Figure 9.

The adjustable speed transmission device indicated by Figures 1, 4 and 5 will be hereinafter referred to as unimountdrive-adjustable speed units. The unit shown in the Figure 1 generally comprises a driving electric motor 10, a speed change unit 11, and an adjustable speed device 12 (hereinafter described) which affords an adjustable drive ratio connection between the motor 10, the speed change unit 11 and the mounting member 13, which affords unity and supportability of the motor 10 and the speed change unit 11 together with the adjustable speed device 12. The unimountdrive-adjustable speed unit shown in the Figures 1, 4 and 5 is indicated as being mounted about a portion of a to-be-driven drive shaft 9 of the to-be-driven machinery. In Figure 1, shaft 9 together with one of its support bearings 8 is indicated in conventional manner by dash lines.

Referring to Figures 1, 4 and 5, the motor 10 is a readily procurable motor with provision for flange mounting and having a power output shaft extended as desired from either end, therefore detail structure is not here described. In this instance, the power output shaft 14 extends from the opposite end to that adjacent the mounting flange indicated by the numeral 17 (and a fragment of its inner face is indicated by dotted lines at 17', Figure 1). The motor flange is provided with mounting bolt holes for the bolts 18, and to match these holes of the motor flange, holes are provided in the mounting member 13, to which is supportably secured the motor 10. In this instance the mounting member 13 is not extended the full distance about the mounting flange, but that portion that does is provided with openings 20 that communicate therethrough with openings provided in the motor structure for the purpose of interior motor ventilation.

The speed change unit 11, in this instance, shows a double reduction gear unit, including a gear housing that is formed of three parts, and they form together with other detail parts an oil-tight enclosure for a desired gearing. One of the parts of this housing is the forward section 21, a second part is a mid section 22, and the third part is a base section 23, all of which are interfitted and fastened together, including the bearing adaptor 19, in ordinary manner to form a single unit (the fastenings are not shown). The base section 23 has a base flange 24 for mounting the speed change unit 11 to the mounting member 13 in a spaced parallel relationship to the motor 10 by screws or bolts 25 (see Figures 4 and 5), and an extension of this base flange forms a universal mounting hub 26 (the utility of which is hereinafter described). The numeral 15 indicates the power input shaft of the speed change unit, and this shaft supports within the gear housing a pinion gear 27, the power input shaft 15 being suitably journaled in bearings 28 and 29. The bearing 28 together with the input shaft 15 are anchored in a regular manner to avert endwise movement. In mesh with the pinion gear 27 is a gear 30 mounted on the shaft 31, which is journaled in the two bearings 32, and the shaft 31 is provided with an ordinary ball bearing lock nut and washer 33 adjacent to the gear 30. The slow speed pinion gear 34 is supported by the shaft 31, adjacent to one of the bearings 32, and this slow speed pinion gear is in mesh with a slow speed gear 35 mounted on the power takeoff shaft 36. The power takeoff is suitably journaled by the bearings 37 and 38, and of these two bearings, the bearing 37, together with the power takeoff shaft, are anchored in regular manner to avert endwise movement. The bearing 38 is in this instance a roller type anti-friction bearing. Also in this instance the power takeoff shaft has an enlarged section which is bored and flanged to receive the bushing 39, and the anchorage of the bushing to the power takeoff flange is by means of the screws 40 (see Figures 4 and 5). The bore and keyseating of the bushing conforms to the size of the driven shaft 9. Bushing 39 may be provided with a setscrew (not shown) to anchor the power takeoff to the shaft 9. The mounting member supports both the motor 10 and the speed change unit 11, of which the gear housing forms a part and supports the bearings thereabout the shafts, and the usual driving connections are provided between the shafts and the gearing. In the situation where speeds are satisfied without speed change gearing, the power input shaft and the power takeoff of the speed change unit may be of single form, suitably journaled, or the speed change unit may take other forms than that described.

Referring to the Figure 4, showing an end elevation of the unimountdrive-adjustable speed unit shown in the Figure 1, the drive angularity in this illustration is considered as horizontal. The motor 10 is shown as being at a distance from the speed change unit 11, and therebetween at a desired position is located a selfaligning support (hereinafter described) indicated generally by the numeral 16, which is joined to the mounting member 13, as will be hereinafter described. Thus, as appears in the Figures 1 and 4, the unimountdrive-adjustable speed unit is mounted about a portion of the to-be-driven drive shaft 9, and virtually supported by the selfaligning support (as is hereinafter described). The base indicated by the numeral 41, Figures 4 and 6, is to be considered rigidly attached to a fixed structure or foundation. It is readily seen that, should it be desired, the mounting member can be extended and the selfaligning support 16 positioned accordingly.

The selfaligning support 16 comprises a relatively simple structure, being formed of a stud 42 having a spherical portion 43 and with suitable shank portions (see Figures 1 and 6). About the spherical portion are disposed the caps 44 and 45, having interior surfaces that bear upon the spherical portion 43 to form a ball type joint. A portion of these two caps are butted together in a hole provided in the mounting member 13 (see Figure 1), and the caps are clamped together by bolts or screws (not shown) while averting clamping of the spherical portion 43 of the stud 42 between the adjacent surfaces of the caps. The caps 44 and 45, being fastened together through the mounting member, become a fixed portion of the mounting member, while the shanks of the stud 42 extend through an enlarged hole in the side of each of the caps and are free to oscillate or rotate with respect to the mounting member, but are restrained from endwise movement, or reversely, the mounting member is free to oscillate or rotate about the spherical portion 43. One end of the stud 42 is shouldered to receive a bar 46, and one end of this bar is clamped to the stud by the nut 47. To the other end of the bar is attached a cross bar 48 (see Figure 6), the attachment between the bar 46 and the cross bar 48 is by the screws 49. The opposite end of the stud 42 is attached to a cylinder 50 of a counterpoise and this cylinder extends in like direction to that of the bar 46 and is attached to the cross bar 48 which is provided with an aperture in line with the cylinder. A cap 45 has an extension reaching over the cylinder in same general direction as that of the cross bar. In line with the spherical portion 43 is a second stud 51 having a spherical end portion 52 similar to that of the spherical portion 43. About this spherical end portion is a cap 53 and a base cap 54, having interior surfaces that bear upon the spherical end portion to form a ball type joint. The cap 53 and the base cap 54 are butted and fastened together by bolts or screws (not shown), while averting clamping of the spherical end portion of the stud 51 between the adjacent surfaces of the cap and the base cap. The cap 53 has an enlarged hole in its side to afford passage therethrough for the shank of the stud 51. Thus, the cap 53 and the base cap 54 being clamped and fastened together, the stud 51 is free to oscillate or rotate with respect to the cap or the base cap or, reversely, the joined cap and base cap are free to oscillate or rotate about the spherical end portion of the stud. The shank of the stud 51 and the cross bar 48 are provided with means attaching same together, as indicated.

The extension of the cap 45 is fitted with a setscrew and lock nut 55 (see Figure 6), and the end of this setscrew bears against a washer 56. The cap 53 has an extension that reaches out to the cylinder 50, forming a shelf for the counterpoise spring 57, and the counterpoise spring, in turn, extends from this shelf to the washer 56, and for the mounting indicated the counterpoise spring is a compression spring. Thus, in the application of the unimountdrive-adjustable speed unit, hereinafter described, adjustment of the setscrew 55, toward or away from the counterpoise spring will regulate the spring force. The longitudinal axis of the counterpoise spring through the cylinder and the end of the cross bar may be in the form of an arc, as there is ample clearance between the outside diameter of the counterpoise spring and the inside diameter of the cylinder.

In the application of the unimountdrive-adjustable speed unit as shown in Figures 1 and 4, assuming that the base 41 of the base cap 54 as being attached to a fixed structure, the motor 10 and the speed change unit 11 together with the adjustable speed device 12 are mounted onto one side of the mounting member 13, and the ball type joint (hereinbefore described) of the selfaligning support 16, being located at the mid thickness of the mounting member, consequently the overhung weight effects a turning force about the ball type joint, which is compensated for by the regulated force of the counterpoise spring 57, for in this example, a fixed foundation affords support of one end of the counterpoise spring that bears upon the extension of the cap 53 and, at the other end, the force of the counterpoise spring is resisted by the extension of the cap 45. Thus, the overhung turning force is balanced by an adjustable resilient force. And in addition, the selfaligning support 16 affords support for the unimountdrive-adjustable speed unit in a manner whereby the to-be-driven drive shaft of the to-be-driven machinery is virtually relieved of the overhung situation of the unimountdrive-adjustable speed unit which is mounted directly about the to be driven drive shaft. And in addition, the selfaligning support affords universal flexibility, which, in turn, permits of misalignment, both parallel and angular, between the shaft to be driven upon which the unimountdrive-adjustable speed unit is directly mounted and the base fastening at the foundation upon which the selfaligning support is supported. In installing this power transmission drive, utilizing this virtually self-supported unimountdrive-adjustable speed unit which is rigidly coupled onto the to-be-driven drive shaft of the to-be-driven machinery, and the unimountdrive-adjustable speed unit support being rigidly coupled to a foundation or support, the misalignment between the two rigidly coupled connections is of no particular concern, for the misalignment permissible in a given application may be considerable. In this instance, it is limited only by the amount of movement provided by the difference between the opening in the side of the caps through which the shank of the studs extends and the size of the shank. Thus, the unimountdrive-adjustable speed unit may be mounted directly about a portion of a shaft to be driven, of which the axis may be deformed or of which the bearings are worn or out of line or other misalignment situations ordinarily encountered in transmission drive applications, while the base 41 may be rigidly attached to a foundation having entirely different angularity; and all the while the drive is protected against undue abuse and wear without resorting to a flexible drive coupling between the two shafts being coupled. Obviously, in the drive indicated by the Figure 4, the base could be supported from above by changing the direction of the counterpoise spring, or the counterpoise spring could be omitted and the unit supported from above through a flexible joint connection.

The unimountdrive-adjustable speed unit application, shown in the Figure 5, includes that hereinabove described, with the exception that the selfaligning support 16 has been removed (the hole in the mounting member 13, about which caps 44 and 45 are assembled onto the mounting member is generally indicated by the numeral 16'), and the drive arrangement is considered vertical, being supportably mounted about the universal mounting hub 26 onto the angle member 58; this angle member in this instance is considered as a portion of the to-be-driven machinery and may be of other form, its purpose being to serve as a foundation for the unimountdrive-adjustable speed unit. This drive arrangement shows another change, which is only an assembly change, and is that the speed change unit 11 is turned ninety degrees about the center of the universal mounting hub, which, in this instance, is in line with the power input shaft and the power takeoff shaft. This change is ordinarily provided by the distribution of the mounting screws or bolts 25, and conveniently provides that the gear 30 extends into the oil usually contained in the gear housing.

Referring to the Figures 1 and 4, the to-be-driven drive shaft of the to-be-driven machinery is indicated by the numeral 9, and in this instance the unimountdrive-adjustable speed unit is supported about the universal mounting hub which may be considered as a foundation and as a portion of the to-be-driven machinery; therefore, the manner in which the portion of the to-be-driven drive shaft is joined to the power takeoff may be considered as affording support for this portion of the to-be-driven drive shaft and, in such event, the indicated bearing 8 (see Figure 1) may be omitted.

The universal mounting hub 26 is shown provided with a groove 59 extending about the universal mounting hub (see Figure 1), and in the arrangement disclosed in Figure 4 a U bolt and nut 60 is shown as extending about a portion of the groove and through a portion of the angle member 58, forming a connection between the two. The mounting arrangement affords a wide range for the difference of the angularity between that of the axis of the to-be-driven drive shaft 9 and the alignment of the foundation supporting the universal mounting hub.

The permissible angularity of drive arrangements is not restricted to that of the horizontal and vertical arrangements herein described, for the device affords drive angularities wherein the motor may be positioned anywhere about the arc 61, Figures 4 and 5. This arc 61 is scribed from the center of the power takeoff shaft in each instance.

The Figures 9 and 10 show a modified form of the adjustable speed power transmission unit, employing a substantially identical adjustable speed device as that shown in Figure 1 (hereinafter described).

Referring to the Figures 9 and 10, and generally indicated by the numeral 11', a speed change unit is shown having a power input shaft 15' and a power takeoff shaft 62, supported for rotation in usual form. This speed change unit affords desired speed change gearing, operatively mounted in a gear housing and formed of an end section 63 and a body section 64; these together with other detail parts are fitted and fastened together, forming an oil tight enclosure for the desired speed change gearing, shafts and their journals. Journals 65, speed change gearing 66 and shafts 67 are generally indicated by dotted lines within the gear housing (the fastenings are not shown). The body section 64 includes base pads 68 which form a mounting base for the device and, in this instance, they are in a fixed relationship to the axis of the power input shaft. The inner end 69 of the body section forms a closure section for the speed change unit adjustable speed device generally indicated by the numeral 12' and the motor generally indicated by the numeral 10'. The motor 10' is a round frame electric motor without feet and minus one end bell and the motor power output shaft is indicated by the numeral 14', supported for rotation, a portion being shown by dotted lines within the motor frame, and also therein, the dotted lines indicate the motor rotor 7. The motor 10' is supportably secured together with the adaptor plate 70, in spaced parallel relationship to the power input shaft 15' and to the inner end 69' (the securing means are not shown). In this instance, to the inner end 69 is also secured a ventilation deflector plate 71, which includes a hub 71', fitted to support the two bearings 72, one of which forms an end support for the motor output shaft 14'. The other motor shaft support bearing 73 is shown by dotted lines within the motor frame.

The adjustable speed device 12' includes two hollow shafts 74 and 74' supported for rotation in a spaced parallel relationship that coincides with the spacing apart of the power output shaft 14' and the power input shaft 15'. The journals supporting the hollow shaft 74 are one of the bearings 72, heretofore mentioned, and the bearing 75, while the hollow shaft 74' is supported by the bearings 76 and 76'. The bearing 76' is contained within the bearing adaptor 77, which is supportably secured to the inner end 69 concentrically with respect to the power input shaft (the securing means are not shown). The power output shaft 14', in this instance, has an end portion formed to fit into an end of the hollow shaft 74, and the power input shaft 15' has an end formed to fit into an end of the hollow shaft 74' and the driving key 78 at these two connections is shown by dotted lines.

In a portion of the hollow shafts 74 and 74' is supportably mounted for rotation the gears 79 (see Figures 9 and 11), the gear shafts 80 about which these gears rotate are supported by the walls of the hollow shafts (see Figures 11 and 3). In mesh with the gears 79 are the racks 81 and 82, therebetween two compression springs 83 (hereinafter described) disposed within each hollow shaft. Each of the racks 82 includes a shank 82' which extends through one end of the hollow shafts 74 and 74', and about the outer end of these shanks are secured the thrust bearings 84, which are located within the bearing housings 85, and the thrust bearings are secured against endwise movement about the shanks 82, as are also the bearing housings 85. To the bearing housings are secured the roller pins 86 (see Figures 9 and 2) which support the control rollers 87 (hereinafter described). The bearing housings 85 are supported with sliding fit into the hubs 88, which also support the bearing 75 of one shaft and the bearing 76 of the other shaft (see Figure 9). These hubs are supportably secured to the support bar 89, of which the hub 90 forms a part (the securing means are not shown). The closure plates 91 attached to the hubs through the support bar 89 by screws (not shown) form a securing means, together with the spacers 92, for location of the bearings 75 and 76. These two bearings are positioned on the hollow shafts by ball bearing lock nuts and the shoulder on the hollow shafts, whereby the hollow shafts are secured against endwise movement. The support bar 89, together with the hub 90, are supportably secured to the extended support bars 93, which are supportably secured to the inner end 69 at the bosses 94, which are a portion of the inner end. The extended support bars 93 are located approximately mid distance between the two hollow shafts, within the inner perimeter of the endless V belts 95 (hereinafter described), see Figures 9 and 10.

Thusly, the hollow shafts 74 and 74' have one of their ends supported by the support bar 89, which in turn is supported by the inner end 69 at the bosses 94, within the inner perimeter of the endless V belts, and the outer perimeter of the support bar, together with certain mechanism which is supported on the support bar and which will be described in detail below, is also within the inner perimeter of the endless V belts 95, all of which provides for easy replacement or removal of the endless V belts about the supported structure, as it is well known these endless V belts are flexible elements.

Referring to the Figure 9, in this instance, there are four adjustable effective diameter pulleys; they are all alike, therefore each is generally indicated by the numeral 96 and, with respect to the hollow shaft 74, two are shown as being adjusted to their minimum effective diameter positions, while with respect to the hollow shaft 74', the cooperating two are shown adjusted to their maximum effective diameter positions. Thus in this illustration, there are two sets of adjustable effective diameter pulleys mounted for rotation in spaced parallel relationship, with a pair of matched endless V belts trained about and therebetween their effective diameters to transmit power from one to the other.

The adjustable effective diameter pulleys 96 are each formed of a pair of cooperating pulley halves 97 and 98, and, in this instance, showing the application of narrow type V belts, they are formed to telescope into one another when adjusting from the minimum effective diameter position. However, when wide section belts are utilized in this device, the pulley half faces need not be of form to telescope. The hubs of the two pulley halves 97 at each of the hollow shafts are connected to an extended tube 99, and an end of the extended tubes is connected to inner hubs 100. The inner hubs are joined to the racks 82 by pins 101, fitted through a portion of the inner hub and a portion of the rack and passing through elongated holes provided in the walls of the hollow shaft in each case. Thus, in each case, from the control roller 87, to and including the two pulley halves 97, forms a unit. And the hubs of the pulley halves 98 at each of the hollow shafts are connected to an extended hub 102, and the extended hubs are joined to the racks 81 by pins 103, which are fitted through a portion of the extended hub and portion of the rack and passing through elongated holes provided in the walls of the hollow shaft in each case. Thus, in each case, from the rack 81, to and including the two pulley halves 98, forms a unit. These two units at each hollow shaft are cooperatively joined by the gear teeth of the gear meshing with the gear teeth of the racks oppositely, and thus movement of one of the racks effects like movement to the other rack oppositely and correspondingly effects similar axial movement of the pulley halves of the cooperating pairs oppositely by equal increment, the inner hubs 100, and the extended hubs 102, affords a sliding fit about the hollow shafts 74 and 74'. These hollow shafts are provided with splines or keys (see Figure 11) and the hubs are provided with keyways to provide a driving connection between the adjustable effective diameter pulley structures and the hollow shafts. During the axial movement, the cooperating pairs of pulley structures on each shaft do not move alike about both shafts, during the entire cycle of the drive ratio change (as is hereinafter described), with the exception of one point only, and then only for an instant do they both move equally, and this is at the mid position, when the effective diameter of both sets of pulley structures are alike.

The control rollers 87, about each of the hollow shafts are, in each case, provided with journals about an end of the roller pins 86. A portion of these roller pins fits into a notch formed at the end portion of the hubs 88 (see Figures 9 and 2), which prevents the bearing housings 85 from revolving with the hollow shafts, but provides for axial movement of the assembly. The outer diameter of the control rollers 87 corresponds to and fits into the groove of the control members 104 (hereinafter described). These two control members are supportably secured to the control nut bracket 105, which is slidably supported about two guide pins 106. The guide pins are supportably secured in an adjusted position about each of their ends by two supports 107, which are, in each case, supportably secured to the support bar 89 as indicated. Each of the supports 107 is provided with an elongated hole (hereinafter described) through which the guide pins extend. Supportably secured about the guide pins is the actuating screw bracket 108, which affords bearing journals 109, for the actuating screw 110. The control nut bracket 105 and the actuating screw 110 are provided with matching screw threads and the actuating screw is journaled in the journals 109 of the actuating screw bracket 108. Set collars 111 provided about the actuating screw prevent its endwise movement.

The control nut bracket 105, together with the two control members 104 secured thereto, form a unit, which is slidably mounted about the guide pins 106, while the actuating screw 110 threaded therethrough is journaled and supported by the actuating screw bracket 108, forming an anchorage for the actuating screw, which is provided with a handwheel 112 and, upon actuation of the handwheel, effects movement in a transverse direction with respect to the axis of the hollow shafts of the unit and simultaneously effects correlative (hereinafter described) axial movement of the hereinbefore described pulley half units of each of the hollow shafts.

Referring to the Figure 9, between the actuating screw bracket 108 and the support bar 89 together with the hub 90, is the takeup stud 113, one end portion of this takeup stud having right hand screw threads while the other end portion has left hand screw threads. One end portion is screwed into a portion of the actuating screw bracket, while the other end portion is screwed into the combined support bar and hub. The support bar is supportably secured as heretofore described, while the actuating screw bracket together with the described control nut bracket unit are supportably mounted about the guide pins 106, and these together with the guide pins forming a second unit that is supportably secured in an adjusted position in the aforesaid elongated holes provided in the supports 107. The clamping of this second unit in an adjusted position about the supports 107 is achieved by the nuts 114 provided at ends of the guide pins. Thus, should it be desired to alter the effective diameter of the adjustable effective diameter pulley structures, to effect a change in the belt path length about and therebetween the effective diameter of the adjustable effective diameter pulleys to accommodate the pitch length of the belt or compensate for service wear, the nuts 114 are loosened and the takeup stud 113 is turned in the desired direction to effect movement of the entire second unit toward or away from the support bar, with consequent desired movement in axial direction of all the heretofore described pulley half units, simultaneously and by equal increments, the conjunction of the two units being about the conjoining of the control rollers 87 and the control members 104. Thus, it is readily seen that the takeup means provides equal change of the effective diameters of the adjustable effective diameter pulley structures at both shafts, consequently the drive ratio between the two adjustable effective diameter pulley structures remains unchanged, all of which does not upset the hereinafter described situation pertaining to condition of maintenance of constant belt path length throughout the entire range of the adjustable effective diameter pulley structures or the cycle of the adjustable drive ratio.

The endless V belts 95 extend about and therebetween the effective diameter of the adjustable effective diameter pulley structures to transmit power from one to the other at variable ratios. The wedge action of the endless V belts therebetween the cooperating pairs of pulley halves produces thrust forces that are transmitted directly to the gear teeth of the gears 79 and the racks 81 and 82, all of which are conveyed to the control members 104 (see Figure 1). And referring to the Figure 9, it is ordinarily desired to determine the size of the hollow shafts to safely accommodate torque and bending stresses and, in such case, the diameter of the hollow shafts does not afford unlimited space for gearing therein, and to accommodate such contingency the springs 83 are utilized to relieve forces at the control mechanism. In applying these compression springs within the hollow shafts, one end of each spring bears upon an unyielding portion, while the other end bears against a shoulder of the rack in each case, in this instance exerting resilient force of desired magnitude in a direction opposite to that of the wedge acting thrust force. This mechanism counteracts any desired portion of the thrust force produced by the wedge action of the endless V belts, independently of the gear teeth or other control elements. In the event that the force exerted by the springs is different from that of the thrust forces produced by the wedge action of the endless V belts therebetween, the cooperating pairs of pulley halves presents no tendency to upset an adjustment of the effective diameters of the adjustable effective diameter pulley structures, for the effective diameters are controlled solely by the means heretofore described. Where greater resilient force is required, a spring could be inserted within the throat of the pulley halves tending to draw pairs of pulley halves toward one another.

The adjustable speed device shown in the Figure 1 is identical to that hereinabove described of the adjustable speed device in the Figure 9, with the exceptions that in this illustration employing only one cooperating pair of adjustable effective diameter pulley structures about the hollow shafts, one of which is supportably secured onto the power output shaft 14 of the motor 10, while the other is supportably secured onto the power input shaft 15 of the speed change unit 11. These shafts are supported for rotation within the motor and the speed change unit, and therefore the adjustable speed device requires no additional bearing support at the support bar. The extended support bar 93', due to the short coupling, is only a single member, which is shown supported by the extension of the closure cap 115, and other than minor changes, the devices are identical throughout.

Referring to the Figure 12, by the addition of the flange plate 118, between the end of the hollow shaft 74' and the shoulder on this shaft, provides together with back face of the pulley half 98, about the hub of this pulley, means for including a compression spring 83', to exert resilient force of desired magnitude in an opposite direction to that of the wedge acting thrust force of the endless V belt, as hereinabove described, of the unit shown in the Figure 9. In this illustration, the compression spring 83' is positioned about the outer diameter of the pulley half hub, and may be included about either one or both of the hollow shafts.

The outline 116, Figures 9 and 10, and 116', Figure 1, generally indicate a two piece cover guard, and their inclusion into the devices are optional, and may be supported by the extensions shown at the guide pins (see Figure 2) and extension of the pin 117 (see Figures 1 and 9).

The diagram Figure 7, is a plan view diagram of the path of the center of the control roller 87, which is also the center of the groove in the control member 104, and in this diagram is the curved line designated CP, derived about axial and transverse movement distances. The distance for 119 is the distance of the total axial movement of the pulley halves of the cooperating pairs when, adjusting from the minimum to the maximum effective diameter of the adjustable effective diameter pulley structures and, the distance for 126, is the distance of the total transverse movement of the control member (or of the unit heretofore described). The direction of the axial movement is parallel to that of the axis of the hollow shafts (see Figure 9), while that of the transverse movement is in a transverse direction to that of the axis of the hollow shafts. The lines representing the two movement distances are at right angle to one another (see Figure 7), forming the triangle S–L–A, the position S is the position of the center of the control roller with the control member adjusted to correspond to one extreme position, and the position L is the position of the center of the control roller with the control member adjusted to correspond to its other extreme position, while the position M is the center of the control roller with the control member adjusted to correspond at mid adjustment. The positions S' and L' are likewise respective positions corresponding to the one-quarter and the three-quarter positions of adjustment. The two distances for 127 are each equal to one-half the distance for 126, or one-half the total transverse movement distance and intersects the mid position M. The four distances for 128 are each equal to one-quarter of the total transverse movement distance and intersect the one-quarter, one-half and the three-quarter positions. Thus, the total transverse movement distance is represented by four equal distances, while corresponding correlated axial movement distances are unequal in each of these divisions. The distance for 120, which represents the axial movement distance when effecting adjustment from the minimum effective diameter position to mid effective diameter position, is greater than the distance for 121, which represents the axial movement distance when effecting adjustment from the mid effective diameter position to the maximum effective diameter position, and all the while the two correlated transverse movement distances for the two divisions 127 are alike. The distance for 122, which represents the axial movement distance when effecting adjustment from the minimum effective diameter position to the first-quarter effective diameter position, is greater than the distance for 124, which represents the axial movement distance when effecting adjustment from the first-quarter effective diameter position to the mid effective diameter position, and all the while the two correlated transverse movement distances for the two divisions, representing one-quarter of the total transverse movement distance, are alike. And further, the distance for 124 is greater than the distance for 125, which represents the axial movement distance when effecting adjustment from the mid effective diameter position to the third-quarter effective diameter position. The distance for 125 is greater than the distance for 123, which represents the axial movement distance when effecting adjustment from the third-quarter effective diameter position to maximum effective diameter position, while the correlated transverse movement distances for the divisions 128 are alike through the entire range. Having determined the triangle S–L–A, of which the dimensions of two of the sides are known, the third side from S to L is readily computed and a line parallel to the transverse movement, distance 119' equal to one-half the distance for 119, from the position A or L, intersects the third side of the triangle at mid position. And the difference between the distance for 120 and the distance for 119' equals the distance for Ha, from which is determined the distance for H, by trigonometric solution. And having the distance for H, and the distance of the third side of the triangle, the radius of the curve CP is computed in regular manner and is equal to RS, RS', RM, RL' and RL, the position Y being the point from which the arc of this curve is scribed. Thus, when effecting transverse movement to the control member 104, in which the groove controlling the axial movement of the control roller 87 is of curved form, while the transverse movement occurs of a straight line form, the correlation of the two movements, results in continual variation of the ratio relationship between the two throughout the range as hereinabove described.

The diagram Figure 8 is a plan view diagram of the two curved CP paths arranged in proper relationship and both control members 104 are shown by broken lines. Referring to the Figures 8 and 9, one of the adjustable effective diameter pulley structures about one of the shafts is shown adjusted to minimum effective diameter position, the heretofore described unit which includes the control members is adjusted to an extreme position, wherein the center of the control roller is at the position S on the curved path, while the other adjustable effective diameter pulley structure, about the other shaft, is adjusted to maximum effective diameter position. Correspondingly, the center of the control roller controlling this pulley structure is at the position L, on the other curved path. The distance separating these two centers S and L on the curved paths in a direction parallel to the axial movement or of the axis of the hollow shafts, is equal to the distance for 119 (see Figure 7 or 8). Hence if it were now desired to adjust the effective diameter pulley structures to their mid effective diameter position, a condition of constant belt path length about and therebetween the effective diameters of the adjustable effective diameter pulley structures is maintained throughout the range of adjustments. Of the curved paths, the intersection of the two at the position M is the position of the centers of both control rollers when both pulley structures are adjusted to mid position; thus, the movement of the unit transversely one-half the total transverse movement distance is equal to the distance for 127, Figure 8, while the control roller controlling the pulley structure about one shaft is adjusted from the minimum effective diameter position S to the mid position M, moving axially the distance equal to that for 120, while the axial movement distance of the other control roller controlling the other pulley structure simultaneously transverses the distance for 121. As heretofore described, the distance for 120 is greater than that for 121; this is in correct order for the very reason that the angle of wrap of the belt about the respective diameters of the pulley structures was less at the minimum effective diameter pulley; therefore, greater effective diameter change was required at this pulley structure to accommodate the belt unwrap about the larger effective diameter pulley structure, and at the mid effective diameter position the angle of wrap of the belt about the effective diameter of the pulley structures is the same, but for the instant only. In the continuation of this adjustment, and from the mid effective diameter positions to the other extreme effective diameter positions, and referring to the Figure 8, and continuing with the control roller that started from the position S, the continuation of the transverse movement of the unit until control roller center is on the position L, moves axially the control roller the distance for 121. Simultaneously therewith, the other control roller transverses axially the distance for 120, all of which occurs in same manner as that hereinabove described, but in reverse order. This is in the correct order, for the effective diameter range of both the adjustable pulley structures are alike, therefore the curve CP of the paths are also alike, but arranged in reverse order, intersecting at the mid position. And thus, in the first instance, it has been shown that the ratio relationship between the axial movement distances and that of the transverse movement distances continually varies, and, in this second instance, it has also been shown that the relationship of the movement of the pulley halves between the two aligned pulley structures also continually varies through the entire range or cycle when maintaining condition of constant belt path length about and therebetween the two aligned adjustable effective diameter pulley structures.

The diagrams and movements described cover drives wherein both pulley sections of each pair of sections are adjusted axially when adjusting the effective diameters of the cooperating pair of adjustable effective diameter pulley structures that are mounted in a space parallel relationship to one another. In a similar drive, where only one pulley section of the cooperating pair of sections of each cooperating pair of adjustable effective diameter pulley structures is movable axially and oppositely to one another when effecting change of the effective diameters in accord one to the other, a similar cycle of the correlated axial movements need occur to maintain a condition of constant belt path length about and therebetween the effective diameter of the adjustable effective diameter pulley structures, with the exception that the axial movements per movable section becomes twice as great for the same change of the effective diameters. In a plan view diagram arrangement, the center paths of the controls occur oppositely to one another to conform with the oppositely positioned movable pulley sections. Obviously in a drive where only one of the pulley sections of each pair is movable axially, the gear and racks would be eliminated from within the shafts, and to connect the axial movable pulley section hub to the thrust bearing, would be made by a simple strut or the like connecting the thrust bearing to the movable section or its hub and the hub or like of the other pulley section of each pair of pulley sections becomes a fixed portion of the shafts.

To fulfill the object heretofore described, the takeup in this instance, wherein only one pulley section of each pair is movable axially, and is applied differently to accommodate the opposite position to one another of the axial movable pulley sections, but the feature is similar and the results are substantially identical. Figure 13 is an end view of drive where only one pulley section of each pair is movable axially and it is similar to that of the Figure 2, but drawn to reduced size. Like parts are designated by same numerals having the suffix ' added after the numeral. The actuating screw bracket 108, Figure 2, is in this instance replaced by an extension of the support bar 89', all of which affords the bearing journals 109' and the supports 107'. The supports 107' are provided with elongated holes which are scribed about the axis of the actuating screw 110', and in which are supported the guide pins 106'. At one of these guide pins the support 107' is provided, the support having oppositely located setscrews 113', and having one of their ends bearing upon a portion of the guide pin. These setscrews replace the takeup stud 113, Figures 1 and 9 (hereinafter described). The ends of the guide pins are provided with threads for the nuts 114' to provide means to lock the guide pins in an adjusted position to the supports 107'. The actuating screw 110' is journaled for rotation by the bearing journals 109', similar to that heretofore described, but with the exception that in this instance the axis position is fixed and does not move laterally when applying the takeup hereinafter described. The control nut bracket 105' together with the two control members 104' secured thereto form a unit which is slidably mounted about the guide pins 106', while the actuating screw 110' is threaded through the control nut bracket 105', and, upon actuation of the handwheel 112', effects movement in transverse direction of the unit and simultaneously effects the correlative heretofore described axial movements of the axially movable pulley half units at each shaft. Spanning about the guide pins 106' are two links 129' which pivot about the axis of the actuating screw 110'. In this instance, to utilize the takeup, the nuts 114' are slightly loosened and turning in the desired direction of the setscrews 113', moves axially, about the axis of the actuating screw the unit, consisting of the guide pins 106', the control nut bracket 105' together with the control members 104' and the links 129', which effects movement axially of one control roller 87 toward the pulley structures, while simultaneously the other control roller 87, a like axial movement is away from the pulley structures, the axis of the actuating screw being located at mid distance between the adjustable pulley structures and is also the pivot about which the links and the control nut bracket 105' are actuated when applying the takeup. Thus, it is readily seen that the takeup affords an equal change of the effective diameters of the cooperating pair of adjustable effective diameter pulley structures, for axial movement of control rollers simultaneously causes change of the axial position of the axially movable pulley sections with consequent change of the effective diameters of the adjustable effective diameter pulley structures formed of the cooperating sections and movable axially with respect to one another. The outer diameter of the control rollers 104', riding within the groove of the control members 104', is of spherical form to accommodate movement in axial direction about the axis of the adjusting screw of the control members 104', without upset of the heretofore described relationship of the adjusting system by the takeup. The distance of takeup movement required to compensate for usual belt wear and stretch or belt manufactures difference in belt length is slight, as is well known in an open belt drive; the total angle of contact of the belt about the effective diameters is always three-hundred and sixty degrees and the takeup provides that effective diameter of both adjustable pulley structures are changed by an equal amount in either direction.

I claim:

1. A variable speed transmission comprising, a driving shaft and a driven shaft rotatively supported in spaced parallel relationship, variable diameter pulley structures mounted in opposed cooperative positions on said shafts, each of said pulley structures comprising complementary sections slidably mounted relative to one another axially of said shaft, a control mechanism, a control actuating mechanism, a common support for said control mechanism and actuating mechanism disposing them intermediate one pair of adjacent ends of said shafts, a unit comprised of said control mechanism and pulley diameter adjusting mechanisms having operable connections with said pulley structure slidable sections and said control mechanism, said unit controlling the diameters of said pulley structures, resilient means between said control mechanism and said pulley diameter adjusting mechanism, said resilient means urging the complementary sections to close relative to one another and operatively effect no adjustment of the diameters of said pulley structures, an endless pulley belt trained about and between said pulley structures, and a constant belt path length maintained about and between the variable diameters of said pulleys.

2. A variable speed transmission comprising, a driving shaft and a driven shaft rotatively supported in spaced parallel relationship, variable diameter pulley structures mounted in opposed cooperative positions on said shafts, each of said pulley structures comprising complementary sections mounted slidably relative to one another axially of said shafts, a control mechanism, a control actuating mechanism, a unit comprised of said control mechanism and pulley diameter adjusting mechanism having operable connection with said pulley structures slidable sections and said control mechanism and said unit controlling the diameters of said pulley structures, resilient means between said control mechanism and said pulley adjusting mechanism, said resilient means urging said complementary sections to close relative to one another and operatively effect no adjustment of the diameter of said pulley structures, an endless pulley belt trained about and between said pulley structures, and a constant belt path length maintained about and between the variable diameters of said pulleys.

3. A variable speed transmission comprising, a driving shaft and a driven shaft rotatably mounted in parallel, pulley structures of variable effective diameters mounted on said shafts, a control mechanism for said pulley diameters interposed between said shafts and operatively connected to said pulleys, a unit housing for said shafts and said control mechanism, a prime mover connected to the driving shaft, a speed change gear assembly interconnecting said driven shaft with a take-off shaft, a common element unifying said unit housing with the prime mover and the speed change gear assembly, and a self-aligning flexible support means for said common unifying element.

4. In a variable speed transmission including variable diameter pulleys mounted on parallel hollow shafts, a control mechanism for varying the effective diameter of said pulleys comprising, movable elements within said hollow shafts having operative connection with the variable diameter pulley adjacent thereto, a control member carried at one end of each of said shafts, linkage connecting each control member with the movable element within the adjacent hollow shaft, a screw element for actuating the control members, and means incorporated in the control members whereby the pulley diameters are oppositely effected simultaneously for the purpose described, and takeup means interconnected to the control members whereby said diameters are both simultaneously changed alike in the same direction.

5. A variable speed transmission comprising, a support structure, said support structure including a prime mover and an overhung portion extending to provide a cantilever support for a journal support, a driving shaft operatively connected with said prime mover and extending from said support structure in a similar direction and parallel to said overhung portion, a driven shaft rotatably supported in spaced parallel relationship to said driving shaft, journals for said driven shaft being supported on said support structure and said journal support, and said cantilever support with said journal support and a pair of adjacent ends of said shafts providing an overhang assembly, variable-diameter pulley structures in opposed cooperative positions on said shafts intermediate of said support structure and said overhang assembly, an endless belt positioned in drive transmitting condition between said pulley structures, pulley controlling mechanisms including said belt operably engaging said pulley structures, actuating mechanism having operable contact with said pulley controlling mechanisms for effecting speed changes between said shafts, and said overhang assembly having a free end and an external perimeter for the purpose described.

6. A variable speed transmission comprising, a support structure, said support structure including a prime mover and an overhung portion extending to provide a cantilever support, a driving shaft operatively connected with said prime mover and extending from said support structure in a similar direction and parallel to said overhung portion, a driven shaft rotatively supported in spaced parallel relationship to said driving shaft, variable-diameter pulley structures in opposed cooperative positions on said shafts, an endless belt positioned in drive transmitting condition between said pulley structures, pulley controlling mechanisms including said belt operably engaging said pulley structures, actuating mechanism having operable contact with said pulley controlling mechanisms for effecting speed changes between said shafts, said cantilever support mounting a portion of said pulley controlling mechanisms and providing an overhang assembly, said overhang assembly including a pair of adjacent ends of said shafts having a free end and an external perimeter for the purpose described.

7. A variable speed transmission comprising, parallel shafts, cooperative variable-diameter pulley structures supported in driving relationship on said shafts, an endless pulley belt positioned in drive transmitting condition between said pulley structures, a pulley control mechanism disposed intermediate one pair of adjacent ends of said shafts, actuating means for said control mechanism, said shafts being mounted for rotation in a fixed spaced relationship to one another, an overhung support extending parallel to and intermediate of said shafts for support of said control mechanism and said actuating means, pulley adjusting mechanism having operable contact with said control mechanism and said cooperative variable-diameter pulley structures, and constructed so that said transmission maintains a constant belt path length about and between said pulley structures.

8. A variable speed transmission comprising, a support structure, said support structure including an overhung portion, a support bar, said support bar being perpendicular to and supportably connected to said overhung portion, shaft journals, said shaft journals being supported by said support structure and said support bar in spaced parallel alignment to provide shaft journals for a driving and a driven shaft, variable-diameter pulley structures mounted in opposed cooperative positions on said driving and driven shafts intermediate a pair of said shaft journals, an endless belt positioned in drive transmitting condition between said pulley structures, a pulley control mechanism, said pulley control mechanism being spaced from said support structure, actuating mechanism having operable contact with said pulley control mechanism, pulley adjusting means operably engaging said pulley control mechanism and said pulley structures, said overhung portion extending parallel to said shafts from said support structure toward said pulley control mechanism and for facilitating placement and removal of said belt while maintaining said supportably connected connection, the external periphery of said support bar and said overhung portion being of relative size to permit of the internal periphery of said endless belt to pass about said external periphery.

9. A variable speed transmission comprising, a support structure, a driving shaft, a driven shaft, variable speed power transmitting means operatively connecting said shafts, speed controlling mechanism operably connecting said variable speed power transmitting means and said support structure, a speed change device interconnecting said driven shaft with a power take-off shaft, a prime mover for said driving shaft, a mounting member unifying said support structure with said prime mover and said speed change device thereby forming a unit, and a universal self-aligning support connected to said mounting member.

10. A variable speed transmission comprising, a driven shaft and a driving shaft supported in parallel spaced relationship, journal supports for said shafts, pulley structures mounted in opposed cooperative positions on said shafts, each of said pulley structures including complementary sections mounted on said shafts for axial movement with respect to one another for changing effective diameters of said pulley structures, an endless belt trained in driving condition about and between said pulley structures, pulley adjusting mechanisms in engagement with said movable sections and disposed at one pair of adjacent ends of said shafts, a pulley control mechanism, linkage means including said belt operatively interconnecting said pulley structures and said pulley adjusting mechanisms together with said control mechanism to provide control for said axial movement, support means, said support means providing support said pulley control mechanism and for journals disposed at one pair of adjacent ends of said shafts, support element for support of said support means, said support element being disposed substantially parallel to the longitudinal axis of said shafts, and the lateral width of the assembly of said support element and said support means together with said journals and said control mechanism mounted therewith providing a form to permit of said endless belt to pass about said lateral width while maintaining said assembly.

11. A variable speed transmission comprising, parallel shafts, cooperative variable diameter pulley structures supported in driving relationship on said shafts, an endless belt positioned in drive transmitting condition between said pulley structures, a pulley control mechanism, an actuating means operatively connected to the pulley control mechanism, pulley adjusting mechanisms having operable contact with said control mechanism and said pulley structures, a support for said control mechanism, a manually actuated takeup element operably interconnected between said pulley control mechanism and said support, said pulley control mechanism together with said actuating means controlling the diameters of said pulley structures being disposed on one side of the plane of the pulley belt, and said takeup element constructed so that it moves said pulley control mechanism in a direction parallel to the longitudinal axis of said shafts to simultaneously change effective diameter of each of said variable diameter pulley structures by like amount.

12. A variable speed transmission comprising, a prime mover having a driving shaft extended therefrom, a driven shaft, a power takeoff shaft operatively connected to the driven shaft, variable diameter pulley structures mounted in opposed cooperative position on the driving and the driven shafts, an endless pulley belt positioned in drive transmitting condition between said pulley structures, a unit comprised of a pulley control mechanism and control actuating mechanism, an overhang support disposed longitudinally intermediate of said shafts, said unit being interconnected to and supported by overhang end portion of said overhang support, and pulley adjusting means engaging said pulley control mechanism and said pulley structures.

13. A variable speed transmission comprising, a driving shaft and a driven shaft supported for rotation in spaced parallel relationship, cooperative variable diameter pulley structures supported in opposed driving relationship on said shafts, each of said pulley structures including complementary sections mounted for axial movement relative to one another, an endless pulley belt positioned in drive transmitting condition between said pulley structures, a pulley control mechanism, actuating mechanism having operable contact with said pulley control mechanism, pulley adjusting mechanism having operable contact with said pulley structures, thrust bearings for said pulley adjusting mechanism, a support bar interconnecting said thrust bearings and said pulley control mechanism, said support bar supportably connected to a support element, and said support element being disposed therebetween and in direction parallel to axis of said shafts.

14. A variable speed transmission as defined in claim 13 and a takeup element operatively mounted between said pulley control mechanism and said support bar, said takeup element being operable to vary the distance between said pulley control mechanism and said support bar and said support element.

15. A variable speed transmission as defined in claim 13, wherein the lateral width of the assembled shafts together with said control mechanism, is substantially less than the inner perimeter of said endless belt to facilitate placement and removal of said belt, while maintaining said interconnecting and said supportably connected connections.

16. A variable speed transmission comprising, a driving shaft and a driven shaft rotatively mounted in parallel spaced relationship, pulley structures of variable effective diameters mounted on said shafts, a control mechanism for said pulley structures interposed between said shafts and operatively connected to said pulleys, a unit formed of said shafts and said control mechanism, a prime mover connected to said driving shaft, a speed change gear assembly unit interconnecting said driven shaft with a power take-off shaft, common element spaced from said control mechanism unifying said gear assembly unit and said prime mover, a support element, said support element extending substantially parallel to and intermediate of said shafts between said common element and said control mechanism, and providing a support for said control mechanism.

17. A variable speed transmission assembly comprising, a support structure, said support structure including an overhung element extending to provide a cantilever support spaced therefrom for a support element, said support element providing a support for thrust bearings, said support structure mounting a prime mover including driving shaft operatively connected therewith, said driving shaft extending from said support structure in a similar direction and parallel to said overhung element, a driven shaft rotatively supported in spaced parallel relationship to said driving shaft, a power takeoff shaft operatively connected to the driven shaft through the medium of a speed change gear device, variable-diameter pulley structures in opposed operative positions on said shafts intermediate said support structure and said support element, an endless belt positioned in drive transmitting condition between said pulley structures, a pulley control mechanism, actuating mechanism having operable contact with said pulley control mechanism, pulley adjusting means including said thrust bearings and comprising a unit, said unit operably engaging said pulley control mechanism and said pulley structures, and an end portion of said assembly comprised of said support element and said unit and including a part of said overhung element providing an external perimeter so as to permit said endless belt to pass over said perimeter to facilitate removal and replacement of said endless belt while substantially maintaining assembly of said variable speed transmission.

18. A variable speed transmission assembly comprising, a support structure, said support structure including an overhung element extending and providing a cantilever support spaced therefrom for a support element, said support structure mounting a prime mover including a driving shaft operatively connected therewith, said driving shaft extending from said support structure in a similar direction and parallel to said overhung element, a driven shaft rotatively supported in spaced parallel relationship to said driving shaft, variable-diameter pulley structures mounted in opposed cooperative positions on said shafts intermediate of said support structure and said support element, each of said pulley structures comprising complementary sections slidably mounted relative to one another axially on said shafts and providing adjustable effective diameter groove at each of said pulley structures for an endless belt being positioned in drive transmitting condition between said pulley structures, a pulley control mechanism, said pulley control mechanism being supportably coupled to said support element, actuating mechanism having operable contact with said pulley control mechanism, pulley adjusting means including resilient means operably engaging said pulley control mechanism and said pulley structure slidable sections, and said assembly including a free end for removing and placing of said endless belt about end parts of said assembly while substantially maintaining said variable speed transmission assembly.

19. A variable speed transmission assembly comprising, a support structure, said support structure including an overhung element extending to provide a cantilever support spaced therefrom for a support bar, said support bar being supportably connected to said cantilever support and extending substantially perpendicular to said overhung element, driving and driven shafts rotatively supported in spaced parallel relationship to one another, said shafts extending from said support structure in a similar direction and parallel to said overhung element, said support bar mounting journals for a pair of adjacent ends of said shafts, variable-diameter pulley structures mounted in opposed cooperative positions on said shafts intermediate of said support structure and said support bar, an endless belt positioned in drive transmitting condition between said pulley structures, a pulley control mechanism, actuating mechanism having operable contact with said pulley control mechanism, pulley adjusting means operably engaging said pulley control mechanism and said pulley structures, takeup element, said takeup element interconnecting said cantilever support and said pulley control mechanism, and said assembly including a free end for removing and placing of said endless belt about end parts of said assembly while substantially maintaining said variable speed transmission assembly.

JOHN D. RIESER.

(References on following page)

References Cited in the file of this patent

UNITED STATES PATENTS

| Number | Name | Date |
|---|---|---|
| 1,235,794 | Hardaker | Aug. 7, 1917 |
| 1,236,749 | Osser | Aug. 14, 1917 |
| 1,993,131 | Borgna | Mar. 5, 1935 |
| 1,993,547 | Heyer | Mar. 5, 1935 |
| 2,005,122 | Young | June 18, 1935 |
| 2,112,157 | Hatcher | Mar. 22, 1938 |
| 2,161,894 | Bishop | June 13, 1939 |
| 2,168,744 | Perrine | Aug. 8, 1939 |
| 2,183,267 | Rieser | Dec. 12, 1939 |
| 2,233,822 | Schubbe | Mar. 4, 1941 |
| 2,475,954 | Gerbing | July 12, 1949 |
| 2,478,870 | Heyer | Aug. 9, 1949 |
| 2,487,980 | Otto | Nov. 15, 1949 |

FOREIGN PATENTS

| Number | Country | Date |
|---|---|---|
| 20,640 | Great Britain | 1914 |
| 462,625 | Great Britain | Mar. 12, 1937 |
| 530,347 | France | Dec. 31, 1921 |
| 72,542 | Switzerland | Sept. 28, 1915 |